United States Patent
Gan et al.

(10) Patent No.: US 11,589,246 B2
(45) Date of Patent: Feb. 21, 2023

(54) METHOD OF MANAGING DISTRIBUTED SELF-ORGANIZING NETWORK BY SURROUNDING BASE STATION INFORMATION AND BASE STATION USING THE SAME

(71) Applicant: Industrial Technology Research Institute, Hsinchu (TW)

(72) Inventors: Chai-Hien Gan, Hsinchu (TW); Yao-Jen Tang, Taoyuan (TW); Pi-Chen Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 17/131,765

(22) Filed: Dec. 23, 2020

(65) Prior Publication Data
US 2022/0201507 A1 Jun. 23, 2022

(51) Int. Cl.
*H04W 24/02* (2009.01)
*H04W 84/18* (2009.01)
(Continued)

(52) U.S. Cl.
CPC ........... *H04W 24/02* (2013.01); *H04W 16/18* (2013.01); *H04W 36/0061* (2013.01);
(Continued)

(58) Field of Classification Search
CPC ..... H04W 24/02; H04W 24/04; H04W 84/18; H04W 16/10; H04W 16/18;
(Continued)

(56) References Cited

U.S. PATENT DOCUMENTS 9,918,239 B2    3/2018  Thomas et al.
10,484,892 B2 * 11/2019 Bellamkonda ........ H04W 24/02
(Continued)

FOREIGN PATENT DOCUMENTS

CN    102612024    7/2012
CN    105228171    1/2016
(Continued)

OTHER PUBLICATIONS

Technical Specification Group Services and System Aspects., "Study on the Self-Organizing Networks (SON) for 5G networks", 3GPP TR 28.861 V16.0.0, Dec. 2019, pp. 1-20.
(Continued)

*Primary Examiner* — Matthew C Sams
(74) *Attorney, Agent, or Firm* — JCIPRNET

(57) ABSTRACT

A method of managing distributed self-organizing network and base station is disclosed. The base station includes but not limited to a transmitter, a receiver, and a processor coupled to the transmitter and the receiver. The processor is configured at least to: create a management interface for receiving configuration information from surrounding base stations; subscribe the configuration information and store the configuration information into a table; receive, via the receiver through the management interface, the configuration information from a base station of the surrounding base stations; update the table based on the configuration information received from the base station of the surrounding base stations; and execute a distributed self-organizing network (DSON) algorithm comprising one of capacity and coverage optimization (CCO) algorithm, automatic neighbor relation (ANR) algorithm, and physical cell id (PCI) algorithm.

18 Claims, 18 Drawing Sheets

(51) Int. Cl.
  *H04W 92/20* (2009.01)
  *H04W 36/00* (2009.01)
  *H04W 16/18* (2009.01)

(52) U.S. Cl.
  CPC ....... *H04W 36/0083* (2013.01); *H04W 84/18* (2013.01); *H04W 92/20* (2013.01)

(58) Field of Classification Search
  CPC ....... H04W 36/0016; H04W 36/00835; H04W 72/10; H04W 74/0833; H04W 76/11; H04W 84/042; H04W 88/08; H04W 36/0061; H04W 36/0083; H04W 92/20; H04L 41/0823; H04L 41/08; H04L 41/0893; H04L 41/12; H04L 41/145; H04L 5/0037
  See application file for complete search history.

(56) References Cited

U.S. PATENT DOCUMENTS

| | | | |
|---|---|---|---|
| 2014/0301277 A1* | 10/2014 | Ueda | H04W 84/18 370/328 |
| 2014/0349661 A1* | 11/2014 | Nuss | H04W 72/10 455/450 |
| 2014/0369336 A1 | 12/2014 | Prakash et al. | |
| 2015/0038144 A1 | 2/2015 | Ahlstrom et al. | |
| 2015/0155996 A1 | 6/2015 | Garcia | |
| 2016/0029253 A1* | 1/2016 | Sarkar | H04W 36/0016 455/436 |
| 2016/0373203 A1 | 12/2016 | Wang et al. | |
| 2017/0134524 A1 | 5/2017 | Ali-Tolppa et al. | |
| 2019/0041922 A1* | 2/2019 | Kurma Raju | G06F 1/1637 |
| 2019/0097891 A1 | 3/2019 | Dandekar et al. | |
| 2019/0261197 A1* | 8/2019 | Bellamkonda | H04W 16/18 |
| 2022/0330072 A1* | 10/2022 | Zeng | H04W 72/04 |

FOREIGN PATENT DOCUMENTS

| | | |
|---|---|---|
| EP | 2827635 | 1/2015 |
| EP | 3094118 | 11/2016 |
| TW | 201844060 | 12/2018 |
| WO | 2013073077 | 5/2013 |
| WO | 2015051037 | 4/2015 |

OTHER PUBLICATIONS

"Office Action of Japan Counterpart Application", dated Mar. 15, 2022, p. 1-p. 4.

Jan Oppolzer et al., "Cell Identifier Assignment in Two-Tier Femtocell Networks", 2013 IEEE 77th Vehicular Technology Conference (VTC Spring), Jun. 2013, pp. 1-5.

Mohammad Sharsheer et al., "Coverage and Capacity Self-Optimisation in LTE-Advanced Using Active Antenna Systems", 2016 IEEE Wireless Communications and Networking Conference, Apr. 2016, pp. 1-5.

Yanguang Liu et al., "Distributed PCI assignment in LTE based on consultation mechanism", 2010 6th International Conference on Wireless Communications Networking and Mobile Computing (WiCOM), Sep. 2010, pp. 1-4.

Ali Gorcin et al., "Hybrid Automatic Neighbor Relations for 5G Wireless Networks", 2017 International Symposium on Wireless Communication Systems (ISWCS), Aug. 2017, pp. 1-6.

Mathew Goonewardena et al., "On Minimum-Collisions Assignment in Heterogeneous Self-Organizing Networks", 2014 IEEE Global Communications Conference, Feb. 2015, pp. 1-6.

Sascha Berger et al., "Online Antenna Tilt-Based Capacity and Coverage Optimization", IEEE Wireless Communications Letters, May 29, 2014, pp. 437-440.

Furqan Ahmed et al., "Self Organized Physical Cell ID Assignment in Multi-Operator Heterogeneous Networks", 2015 IEEE 81st Vehicular Technology Conference (VTC Spring), May 2015, pp. 1-5.

"Office Action of Taiwan Counterpart Application", dated Dec. 28, 2021, p. 1-p. 6.

* cited by examiner

| Cell ID 801 | TNL Address 802 | PCI 803 | neighboring BS's PCI list 804 | number of surrounding BSs 805 | Location 806 | TxPower/ Beam 807 | Status (Activation/ Deactivation) 808 |
|---|---|---|---|---|---|---|---|
| Cell 1 | IP 1 | PCI 1 | NPList1 | N1 | (x1,y1,z1) | p1 dbm/Beam b1 | A |
| Cell 2 | IP 2 | PCI 2 | NPList2 | N2 | (x2,y2,z2) | p2 dbm/Beam b2 | A |
| Cell 3 | IP 3 | PCI 3 | NPList3 | N3 | (x3,y3,z3) | p3 dbm/Beam b3 | D |
| Cell 4 | IP 4 | PCI 4 | NPList4 | N4 | (x4,y4,z4) | p4 dbm/Beam b4 | A |
| ... | | | | | | | ... |

| Cell ID | TNL Address | PCI | neighboring BS's PCI list | number of surrounding BSs | Location | TxPower/ Beam | Status (Activation/ Deactivation) |
|---|---|---|---|---|---|---|---|
| Cell 5 | IP 1 | ... | ... | ... | L5 | ... | ... |
| Cell 6 | IP 2 | ... | ... | ... | L6 | ... | ... |

FIG. 20

| Cell ID | TNL Address | PCI | neighboring BS's PCI list | number of surrounding BSs | Location | TxPower/Beam | Status (Activation/Deactivation) |
|---|---|---|---|---|---|---|---|
| Cell 5 | IP 1 | PCI5 | NPL5 | NN5 | L5 | TX5/Beam5 | A |
| Cell 6 | IP 2 | PCI6 | NPL6 | NN6 | L6 | TX6/Beam6 | A |

METHOD OF MANAGING DISTRIBUTED SELF-ORGANIZING NETWORK BY SURROUNDING BASE STATION INFORMATION AND BASE STATION USING THE SAME

TECHNICAL FIELD

The disclosure is directed to a method of managing a distributed self-organizing network (DSON) by surrounding base station information and a base station using the same method.

BACKGROUND

Depending on where a self-organizing network (SON) algorithm is executed, 3GPP (3rd Generation Partnership Project) classifies SON algorithms into centralized SON (CSON), distributed SON (DSON), and hybrid SON (HSON) architectures. In a CSON architecture, SON algorithms are executed at a centralized server. In a DSON architecture, SON algorithms are executed at a base station. In a HSON architecture, SON algorithms may be executed at either a centralized server or at a base station.

DSON algorithms which are executed at a base station may make use of the coordination between a base station and another base station to perform self-configuration, self-optimization, and self-healing at the base station. DSON algorithms have the advantage of easy deployment. However, it is generally more difficult for DSON algorithms to collect sufficient decision information for network optimization because the DSON algorithms are decentralized and executed at each individual base station.

SUMMARY OF THE DISCLOSURE

Accordingly, the disclosure is directed to a method of managing a distributed self-organizing network (DSON) by surrounding base station information and a base station using the same method.

In an aspect, the disclosure is directed to a base station which includes not limited to: a transmitter; a receiver; and a processor coupled to the transmitter and the receiver. The processor is configured at least to: create a management interface for receiving configuration information from surrounding base stations; subscribe the configuration information and store the configuration information into a table; receive, via the receiver through the management interface, the configuration information from a base station of the surrounding base stations; update the table based on the configuration information received from the base station of the surrounding base stations; and execute a distributed self-organizing network (DSON) algorithm comprising one of capacity and coverage optimization (CCO) algorithm, automatic neighbor relation (ANR) algorithm, and physical cell id (PCI) algorithm.

In an aspect, the disclosure is directed to a method, used by a base station, of managing a DSON by surrounding base station information. The method includes not limited to: creating a management interface for receiving configuration information from surrounding base stations; subscribing the configuration information and storing the configuration information into a table; receiving, via the receiver through the management interface, the configuration information from a base station of the surrounding base stations; updating the table based on the configuration information received from the base station of the surrounding base stations; and executing a distributed self-organizing network (DSON) algorithm comprising one of capacity and coverage optimization (CCO) algorithm, automatic neighbor relation (ANR) algorithm, and physical cell id (PCI) algorithm.

To make the aforementioned more comprehensible, several embodiments accompanied with drawings are described in detail as follows. It is to be understood that both the foregoing general description and the following detailed description are exemplary and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8 illustrates an implementation example of a surrounding base station information table (SBSIT) used by a base station for storing configuration management information according to one of the exemplary embodiments of the disclosure.

FIG. 20 illustrates a first implementation example of a surrounding base station information table in an application example of a 5G private network.

FIG. 22 illustrates a second implementation example of a surrounding base station information table in an application example of a 5G private network.

DETAILED DESCRIPTION OF DISCLOSED EMBODIMENTS

Figure 1:
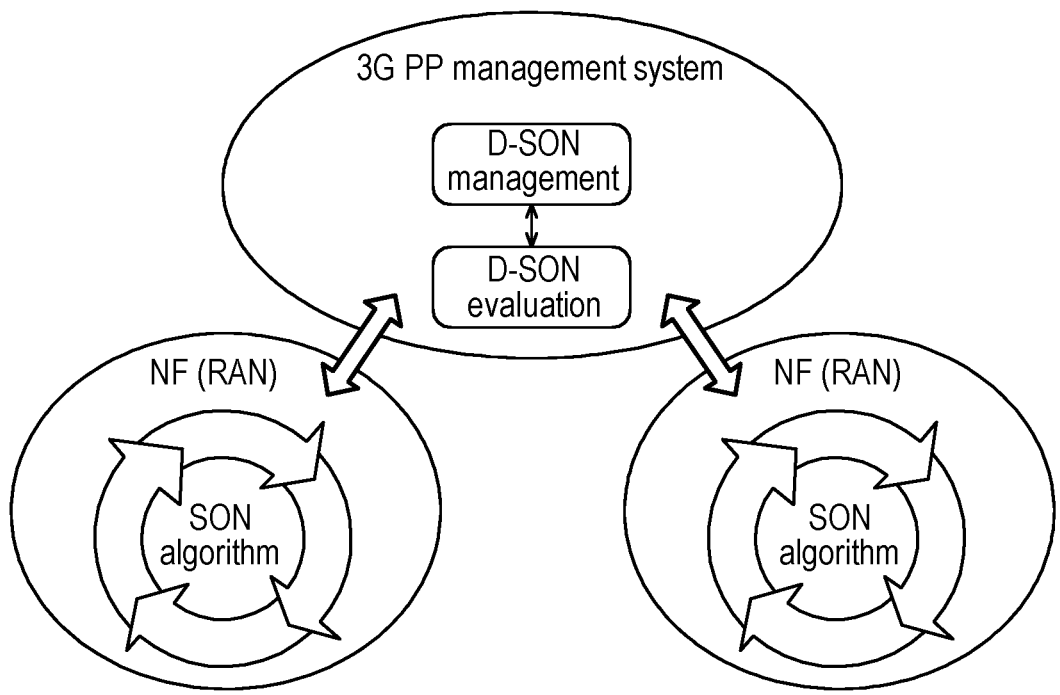
FIG. 1 illustrates an architecture of a distributed self-organizing network system.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a method of managing a DSON and a base station (BS) using the same method. A base station may make use of configuration management service specified by 3GPP management system to receive decision information for DSON algorithms. The base station may establish a surrounding base station information table (SBSIT) to store configuration information for DSON algorithms such that the DSON algorithms (for example, CCO, ANR or PCI algorithms) may be executed according to the configuration information in the SBSIT.

FIG. 1 illustrates an architecture of a distributed self-organizing network system. When DSON algorithms are executed at a base station, 3GPP management system can communicate with the base station to provide DSON management functions (for example, initiation of SON mechanism or parameter setting) and performance evaluation functions.

Figure 2:
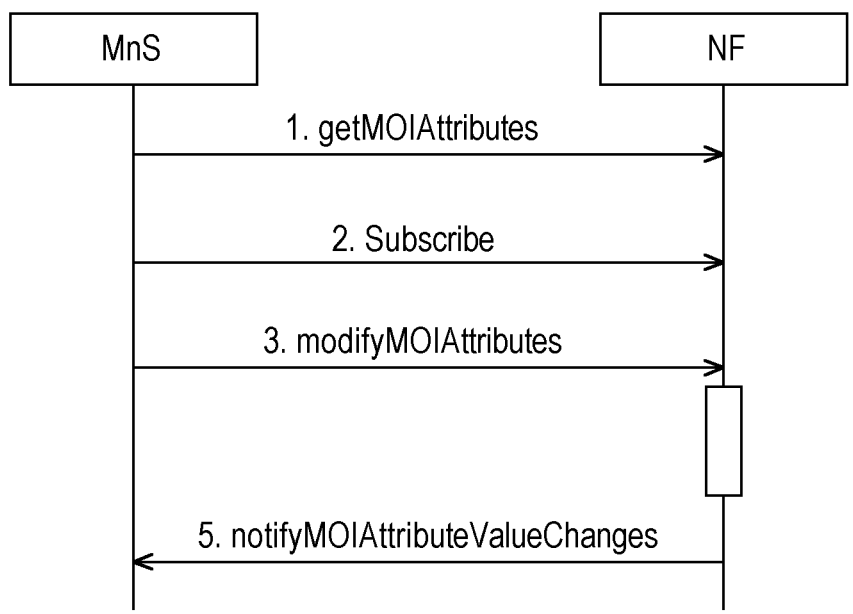
FIG. 2 illustrates an example of configuration management service provided by 3GPP configuration management system.

3GPP specifies configuration management (CM) service by providing a management system (MnS) to configure network functions (NF). FIG. 2 illustrates an example of configuration management service provided by 3GPP configuration management system. Referring to FIG. 2, the configuration management service provides the MnS with functions to get, modify, subscribe to, and unsubscribe from attributes of a managed object instance (MOI). Through the configuration management service, the MnS gets attributes of the MOI of a NF. The MnS subscribes to value changes of attributes of the MOI. The MnS modifies the attributes of the MOI of the NF. When the MOI subscribed by the MnS changes value, a notification message of the value changes will be sent to subscribers.

A base station mainly uses the X2/Xn interface to exchange information with other base stations, and a base station uses a control-plane interface to collect surrounding base station information from user equipment (UE) measurement report to provide DSON mechanisms. In addition to X2/Xn and control-plane interfaces, through the configuration management service, the MnS allows the base station to obtain timely and sufficient decision information for network optimization management algorithms such as coverage and capacity optimization (CCO), automatic neighbor relations (ANR), and physical cell id (PCI) allocation.

Figure 3:
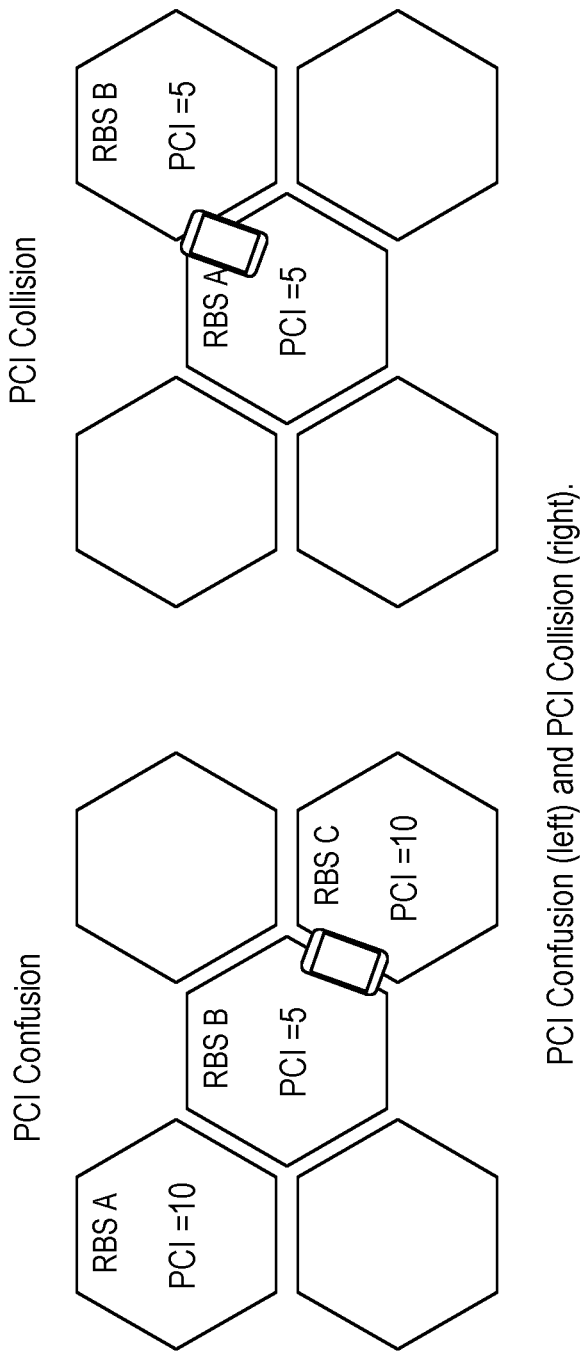
FIG. 3 illustrates an application scenario of managing a DSON in a situation of PCI confusion and PCI collision.

FIG. 3 illustrates an application scenario of managing a DSON in a situation of PCI confusion and PCI collision. Referring to FIG. 3, a base station obtains PCI configuration from surrounding base stations by X2/Xn interface to determine available PCI values and to select an unused PCI value. Then, UE measurement report is used to determine whether there are PCI collisions. However, neighboring base stations may not establish X2/Xn connection, and PCI statuses in UE measurement reports may not be the same. A DSON algorithm may fail to notice a PCI confusion or a PCI collision which could possibly result in handover failures and interferences (such as a radio link failure) between base stations.

Figure 4:
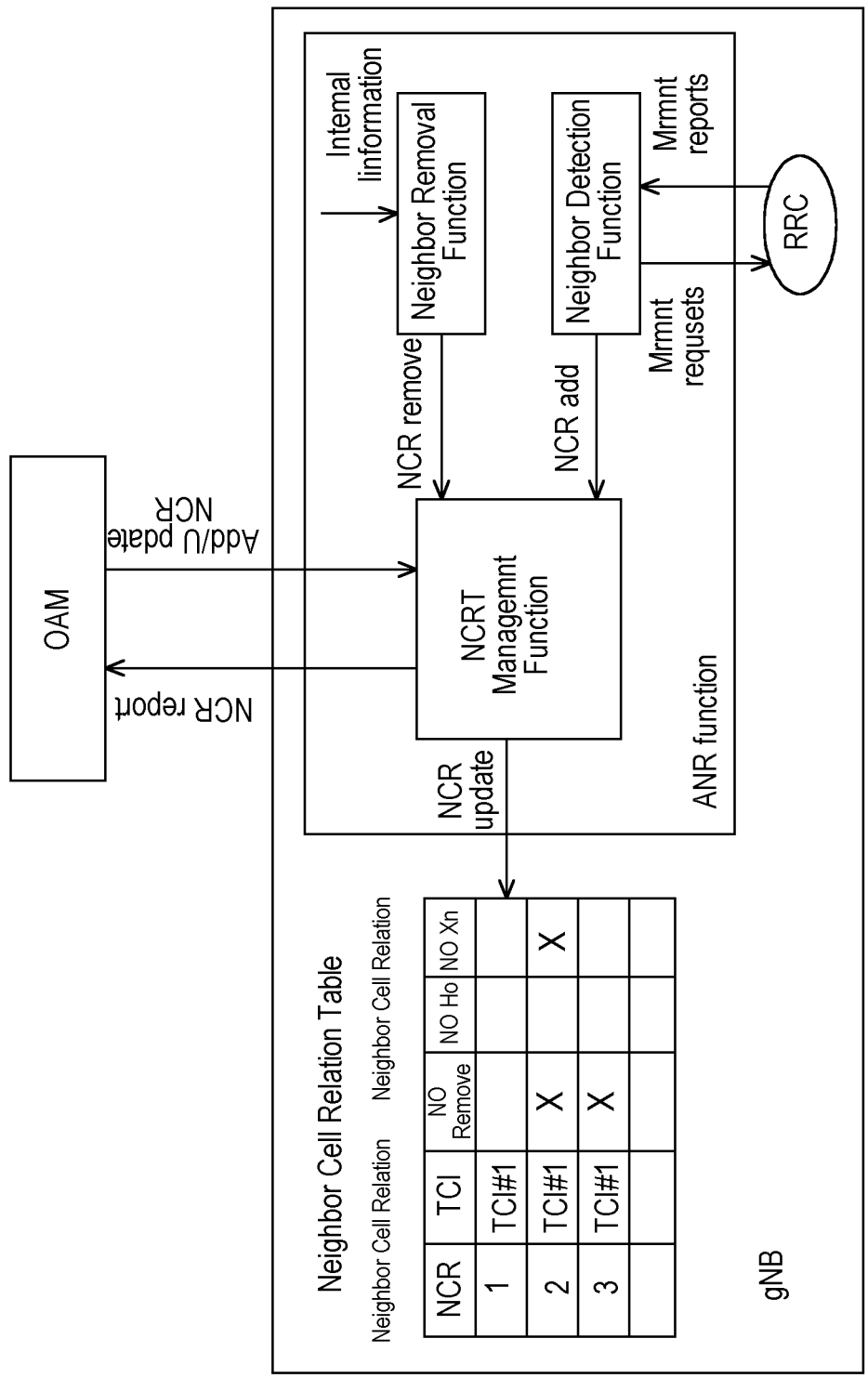
FIG. 4 illustrates an application scenario of managing a DSON for automatic neighbor relations.

FIG. 4 illustrates an application scenario of DSON for automatic neighbor relations. Referring to FIG. 4, through the control-plane interface, a base station obtains surrounding base station information by UE measurement report to establish a neighbor cell relation table (NCRT). In order to add a neighboring base station to the NCRT, the base station would wait until a UE successfully measures the neighboring base station for the neighboring base station to appear in the UE measurement report. In the application scenario of ANR, through the configuration management service, the base station may establish a surrounding base station information table (SBSIT) to store configuration information such that the base station could collect timely information to represent up-to-date neighbor relations. In one embodiment of the disclosure, a neighboring base station is referred to a base station which has established a neighbor cell relation via the neighbor cell relation table. In one embodiment of the disclosure, a surrounding base station refers to a base station in geographical proximity, but the base station may or may not have established a neighbor cell relation via the NCRT.

Figure 5:
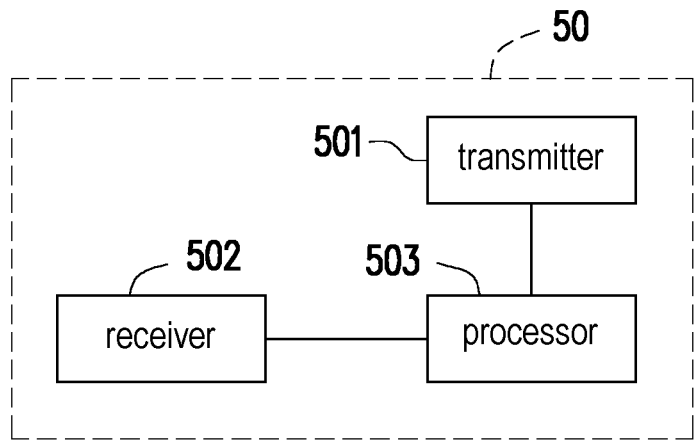
FIG. 5 illustrates a block diagram of a base station in accordance with one of the exemplary embodiments of the disclosure.

FIG. 5 illustrates a block diagram of a base station in accordance with one of the exemplary embodiments of the disclosure. Referring to FIG. 5, the base station 50 may include but not limited to a transmitter 501, a receiver 502, and a processor 503 coupled to the transmitter 501 and the receiver 502. The processor 503 may be configured to execute embodiments of the disclosure. For example, processor 503 may be configured to process the method of managing a DSON. In one embodiment, the processor 503 would be configured at least to: create a management interface for receiving configuration information from surrounding base stations; subscribe the configuration information and store the configuration information into a table; receive, via the receiver through the management interface, the configuration information from a base station of the surrounding base stations; update the table based on the configuration information received from the base station; and execute a distributed self-organizing network (DSON) algorithm comprising one of capacity and coverage optimization (CCO) algorithm, automatic neighbor relation (ANR) algorithm, and physical cell id (PCI) algorithm. In one exemplary embodiments of the disclosure, the base station 50 may be a node B, an evolved node B (eNB), or a gNB.

The various illustrative blocks in FIG. 5 may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. The processor 503 may be a microprocessor, but in the alternative, the processor 503 may be any commercially available processor, controller, microcontroller, or state machine. The processor 503 may also be implemented as a combination of computing devices, e.g., a combination of a DSP and a microprocessor, a plurality of microprocessors, one or more microprocessors in conjunction with a DSP core, or any other such configuration.

Figure 6:
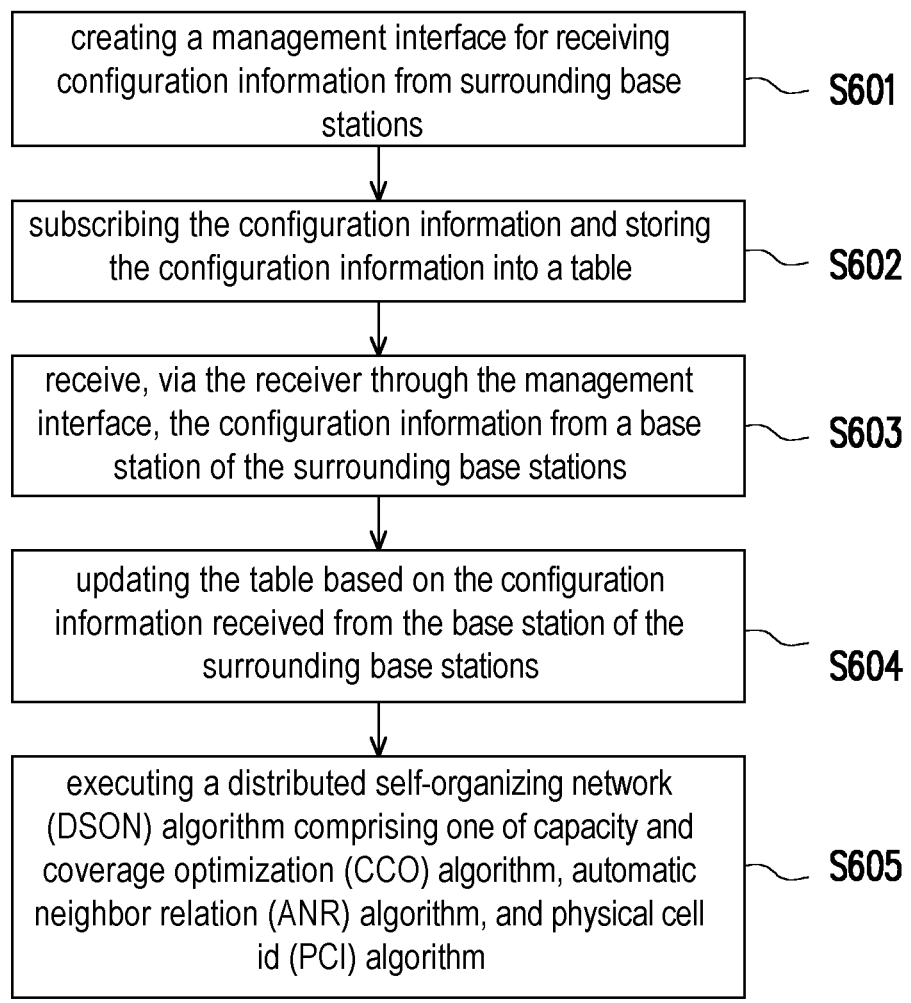
FIG. 6 is a flow chart which shows the steps of a method of managing a distributed self-organizing network according to one of the exemplary embodiments of the disclosure.

FIG. 6 is a flow chart which shows the steps of a method of managing a distributed self-organizing network according to one of the exemplary embodiments of the disclosure. The method could be used by a base station. In step S601, the base station may create a management interface for receiving configuration information from surrounding base stations. In step S602, the base station may subscribe the configuration information and store the configuration information into a table. In step S603, the base station may receive, via the receiver through the management interface, the configuration information from a base station of the surrounding base stations. In step S604, the base station may update the table based on the configuration information received from the base station of the surrounding base stations. In step S605, the base station may execute a distributed self-organizing network (DSON) algorithm comprising one of capacity and coverage optimization (CCO) algorithm, automatic neighbor relation (ANR) algorithm, and physical cell id (PCI) algorithm.

Figure 7A:
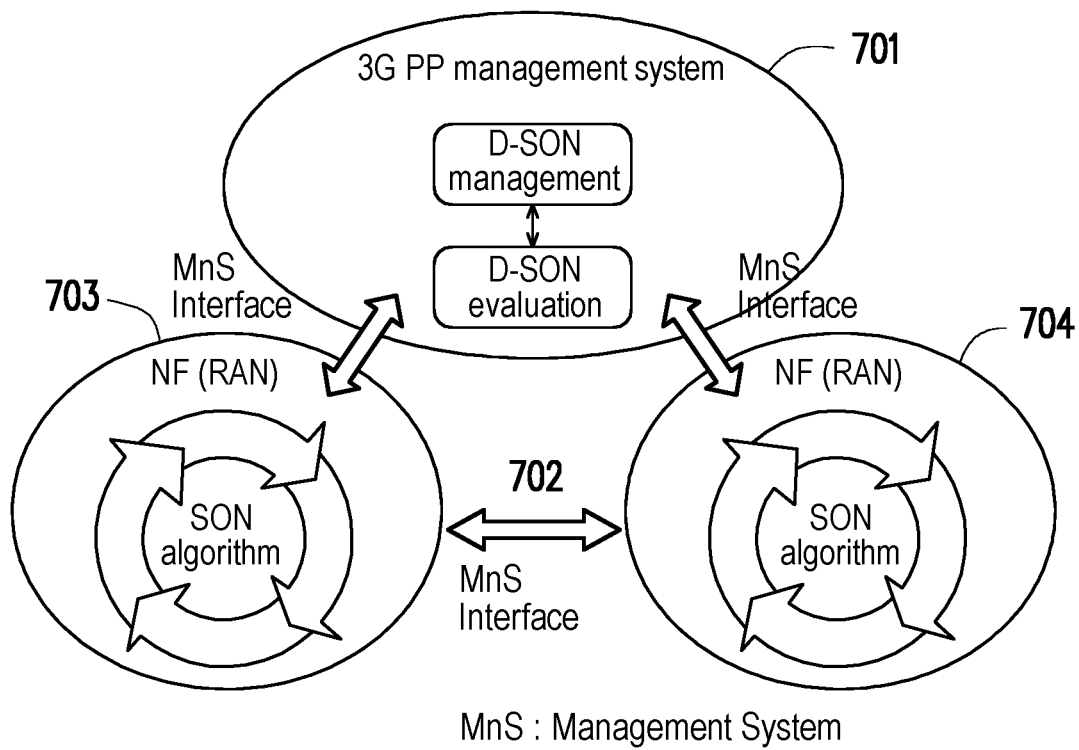
FIG. 7A illustrates an architecture of configuration management of DSON through a 3GPP management system interface according to one of the exemplary embodiments of the disclosure.

FIG. 7A illustrates an architecture of configuration management of a DSON through a 3GPP management system interface according to one of the exemplary embodiments of the disclosure. In one embodiment, a DSON system may use 3GPP management system 701 to manage, via MnS interface 702, information exchange between base station 703 and base station 704. The base stations 703, 704 may provide network functions as radio access network. The MnS interface 702 could be created between the 3GPP management system 701 and a plurality of base stations 703, 704. The MnS interface could also be created between base stations 703 and 704 by direct connection. According to configuration information gathered through MnS interfaces, 3GPP management system 701 may perform DSON management and DSON evaluation to configure network management parameters. Then, base stations 703, 704 may receive configuration information to executed DSON algorithms such as CCO adjustment, ANR establishment, and PCI allocation or reallocation.

Figure 7B:
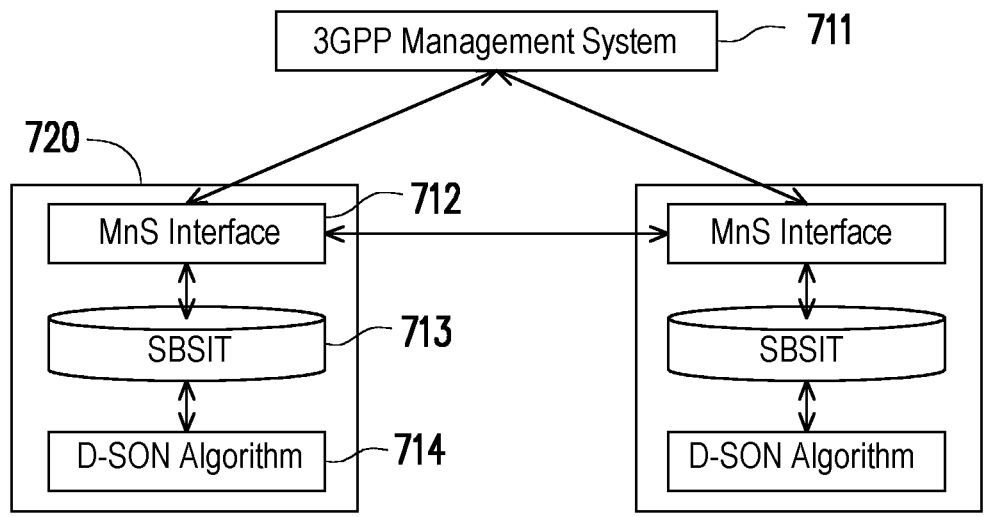
FIG. 7B illustrates an example of exchanging information between base stations through a 3GPP management system interface according to one of the exemplary embodiments of the disclosure.

FIG. 7B illustrates an example of exchanging information between base stations through a 3GPP management system interface according to one of the exemplary embodiments of the disclosure. Referring to FIG. 7B, base station 720 may create MnS interface 712 to transmit and receive configuration information of another base station through 3GPP management system 711. Then, base station 720 may store the configuration information in a surrounding base station information table (SBSIT) 713. The DSON algorithm 714 may be executed by the base station 720 according to configuration information in SBSIT 713.

FIG. 8 illustrates an implementation example of a surrounding base station information table (SBSIT) used by a base station for storing configuration management information according to one of the exemplary embodiments of the disclosure. Referring to FIG. 8, in one embodiment, SBSIT 800 may store Cell ID 801, transport layer (TNL) address 802, physical cell id (PCI) 803, neighboring base station's PCI list 804, number of surrounding base stations 805, location 806, transmission power (TxPower)/Beam 807, and status 808. In one embodiment, Cell ID 801 could be a unique global identification associated with a base station. TNL address 802 could be IP address and/or port of the base station. PCI 803 could be a PCI value in 0-1007 or could be −1 for unassigned PCI value. Neighboring base station's PCI list 804 could be a list of PCI values of neighboring base stations of the base station. Number of surrounding base stations 805 could be the number of surrounding base stations which may exchange configuration information with the base station via MnS interface. Location 806 could be a global position system (GPS) coordinate with height. TxPower/Beam 807 could be transmission power measure in dbm, for example −15~24 dbm, along with a number corresponding to a beam pattern. Status 808 could be activation (A) or deactivation (D). In one embodiment, each base station in a DSON may establish a different SBSIT 800 to store configuration information corresponding partly to table entries 801~808 according to decision information needed to execute different DSON algorithms.

Figure 9:
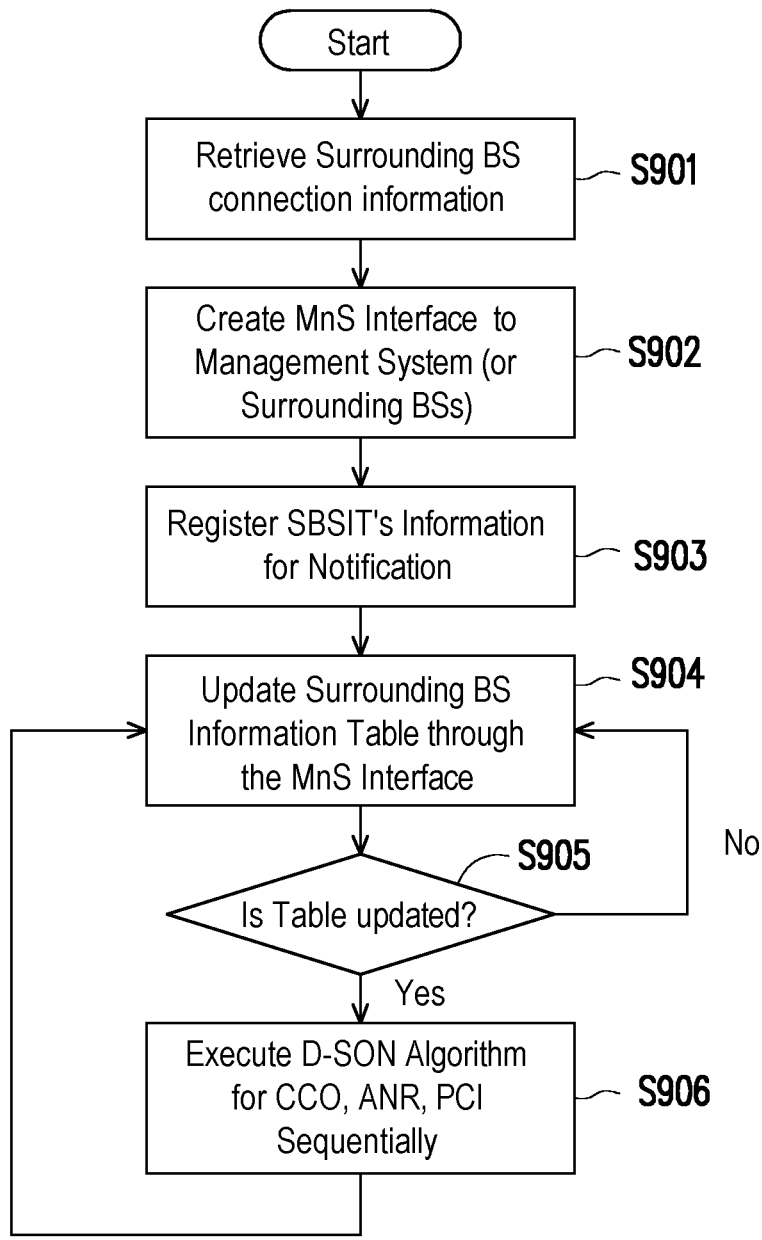
FIG. 9 illustrates an exemplary embodiment of a method of managing a distributed self-organizing network.

FIG. 9 illustrates an exemplary embodiment of a method of managing a distributed self-organizing network. In step S901, a base station may retrieve surrounding base station connection information which may include Cell ID, TNL address, and location. In step S902, in a first exemplary embodiment, the base station may create MnS interface to management system, for example, 3GPP configuration management (CM) system. In a second exemplary embodiment, the base station may also create MnS interface to the surrounding base stations. For example, the MnS interface could be created via Netconf function of the base station to obtain surrounding base station information. In step S903, the base station may register SBSIT's information for notification. In step S904, the base station may update the SBSIT through the MnS interface. In one exemplary embodiment, the base station may receive notification, which indicates the registered SBSIT's information being changed, from MnS interface. In step S905, the base station may keep monitoring whether the SBSIT is updated. When the SBSIT is not updated, the base station may repeat step S904 to update the SBSIT through the MnS interface. When the SBSIT is updated, the base station may proceed to step S906. In step S906, the base station may execute DSON algorithms for CCO, ANR, and/or PCI to optimize network performance. In one embodiment, the base station may execute the CCO algorithm, the ANR algorithm, and the PCI algorithm sequentially.

It is to be noted that in order to establish the SBSIT, the base station may begin with receiving configuration information from surrounding base stations. In one of the exemplary embodiments, the received configuration information may include at least Cell ID, location and TNL address. A surrounding base station could be a neighboring base station which has a coverage area overlap with the base station according to current TxPower setups of both of the base station and the neighboring base station.

Figure 10:
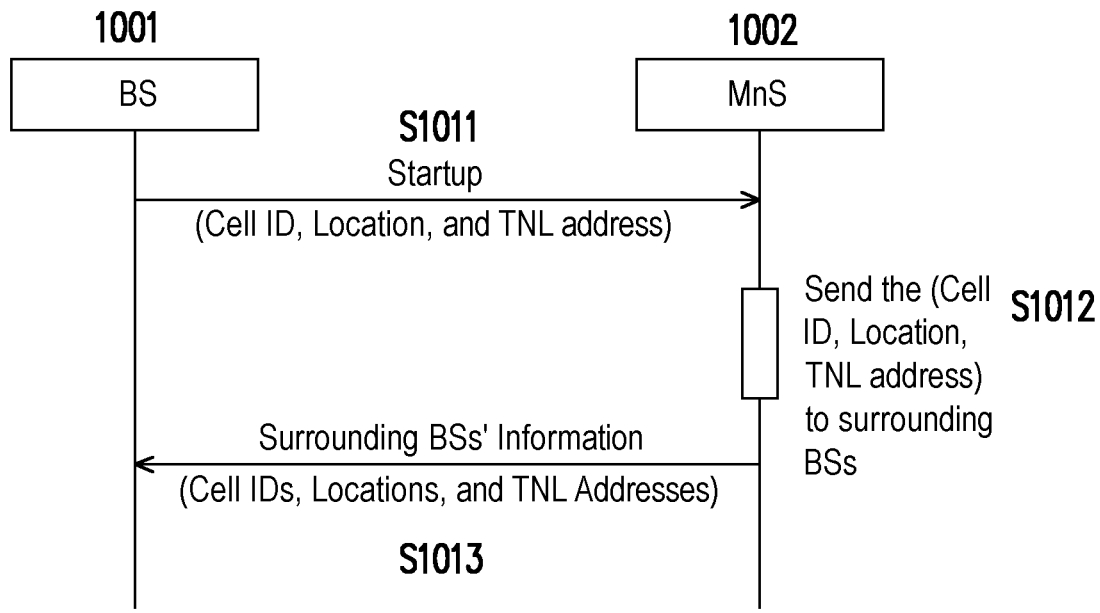
FIG. 10 is a signaling diagram which illustrates a first exemplary embodiment of a base station creating a management interface for receiving configuration information from surrounding base stations.

In a first exemplary embodiment, a base station may create a management interface for receiving configuration information from a surrounding base station through MnS. Referring to FIG. 10, base station 1001 may exchange configuration information with MnS 1002. In step S1011, base station 1001 may notify MnS 1002 of its Cell ID, location, and TNL address at startup stage. In step S1012, through MnS 1002, configuration information (Cell ID, location, and TNL address) may be sent to one or more surrounding base stations. In step S1013, through MnS 1002, the base station may receive configuration information of the one or more surrounding base stations.

Figure 11:
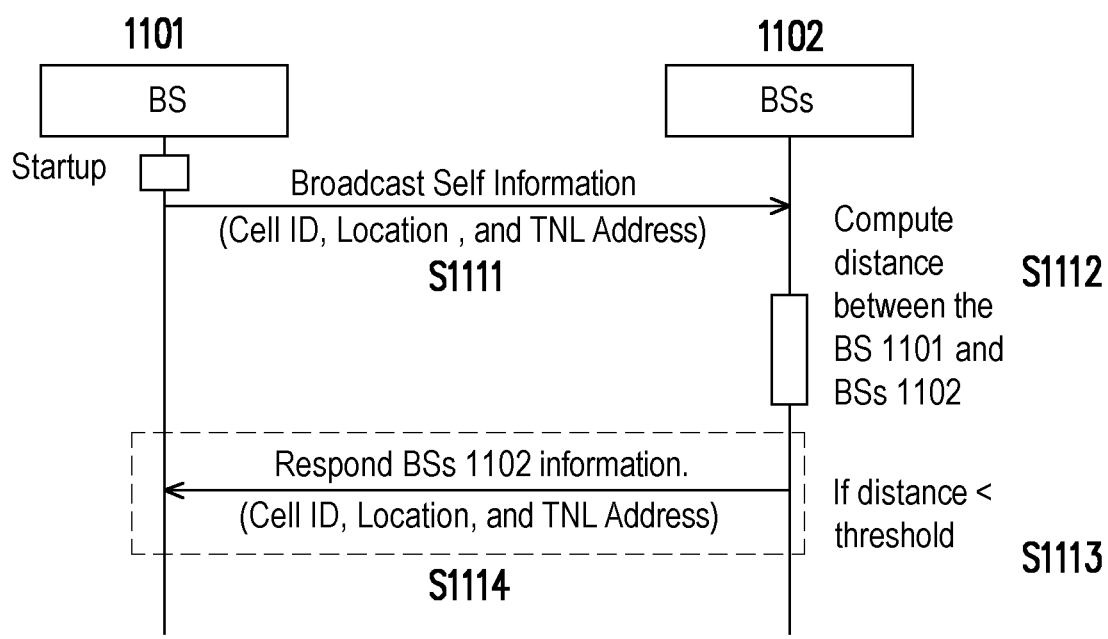
FIG. 11 is a signaling diagram which illustrates a second exemplary embodiment of a base station creating a management interface for receiving configuration information from surrounding base stations.

In a second exemplary embodiment, a base station may create a management interface for receiving configuration information from a surrounding base station through a direct connection. Referring to FIG. 11, base station 1101 may exchange configuration information with base station 1102. In step S1111, base station 1101 may broadcast its configuration information (for example, Cell ID, location and TNL address) to base station 1102. In step S1112, base station 1102 may compute a distance from base station 1101, and base station 1102 may compute a threshold according a maximum transmission distance of the base station 1102. The maximum transmission distance may be determined by estimation of maximum TxPower. In one embodiment, the threshold could be set as twice of the maximum transmission distance. In step S1113, base station 1102 may determine whether the distance is smaller than the threshold. If the distance is smaller than the threshold, in step S1114, base station 1102 may respond configuration information (for example, Cell ID, location and TNL address) to base station 1101.

In one embodiment, a base station may add configuration information of surrounding base stations to SBSIT by presetting the configuration information in the SBSIT.

Figure 12:
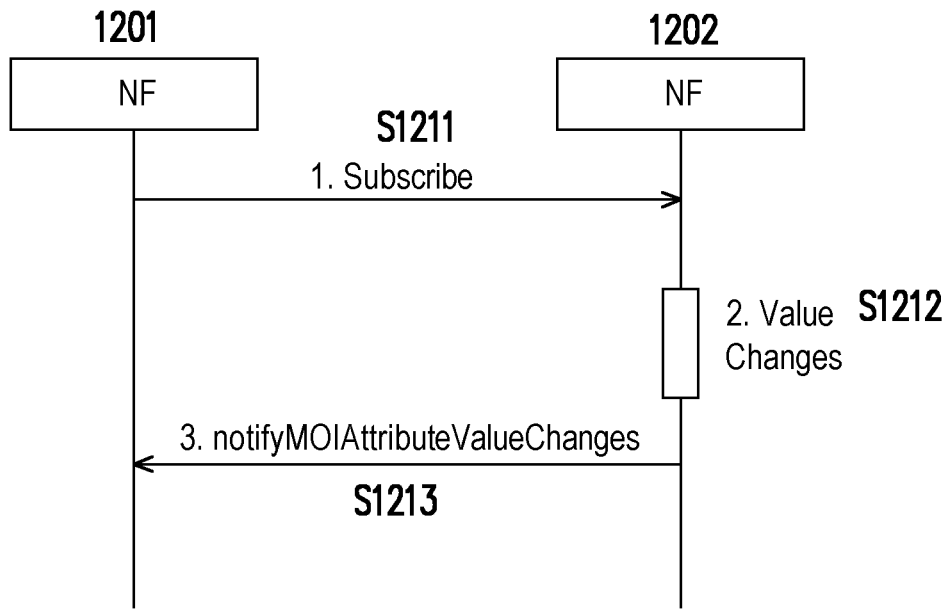
FIG. 12 is a signaling diagram which illustrates a base station subscribes to value changes in a surrounding base station information table through a notification in accordance with one of the exemplary embodiments of the disclosure.

FIG. 12 is a signaling diagram which illustrates a base station subscribes to value changes in a surrounding base station information table through a notification in accordance with one of the exemplary embodiments of the disclosure. Referring to FIG. 12, base station 1201 as network function (NF) may exchange information with another base station 1202. In step S1211, base station 1201 may subscribe to some value changes in the SBSIT of base station 1202 through MnS interface. In step S1212, value changes which are subscribed by base station 1201 would be monitored by base station 1202. In step S1213, base station 1202 would send a notification to base station 1201 when there are value changes in the SBSIT of base station 1202.

In one embodiment, when the SBSIT of a base station is updated, the base station would execute one of the CCO, ANR, and PCI DSON algorithms to optimize network performance.

Figure 13:
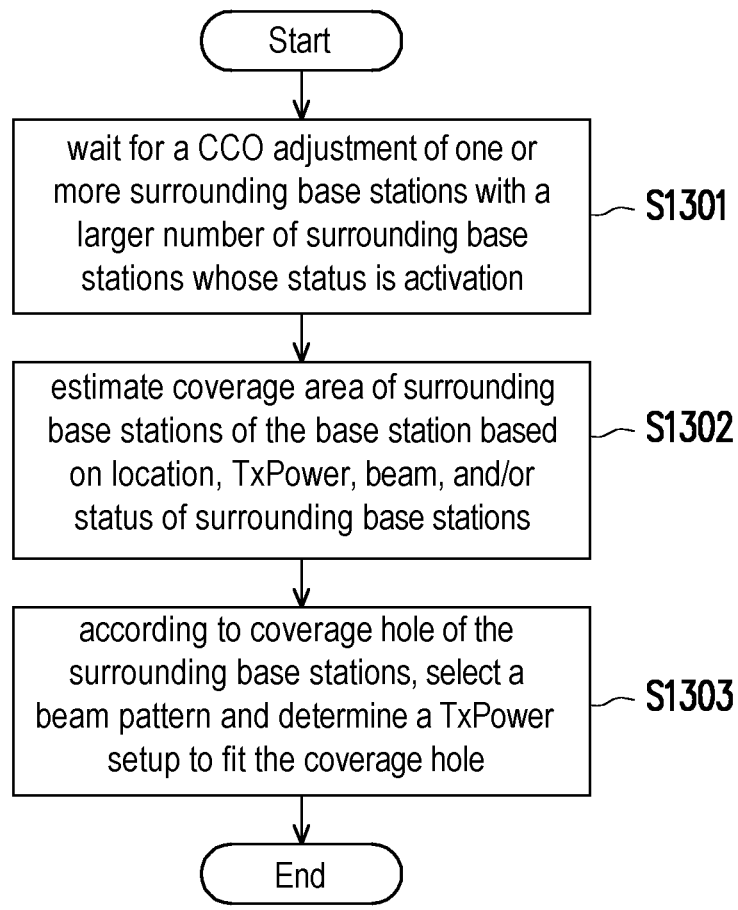
FIG. 13 is flow chart which illustrates the steps of executing a CCO algorithm according to one of the exemplary embodiments of the disclosure.

In one of the exemplary embodiments, the CCO algorithm may adjust the coverage area of a base station based on configuration information which could include location, TxPower, beam, and/or status. Referring to FIG. 13, steps S1301~S1303 elucidate the execution of the CCO algorithm according to one of the exemplary embodiments of the disclosure. In step S1301, according to the content of SBSIT, the base station may wait for a CCO adjustment of one or more surrounding base stations with a larger number of surrounding base stations whose status is activation. After the CCO adjustment of the one or more neighboring base stations with a larger number of surrounding base stations are complete, the base station may perform CCO adjustment. In step S1302, the base station may estimate coverage area of surrounding base stations of the base station. For example, the base station may estimate coverage area of surrounding base stations based on location, TxPower, beam, and/or status of surrounding base stations. In step S1303, according to coverage hole of the surrounding base stations, the base station may select a beam pattern and determine a TxPower setup to fit the coverage hole.

In some embodiments, when two base stations have the same number of surrounding base stations, the base station with larger Cell ID would perform the CCO adjustment first.

In some embodiments, when a base station with a larger number of surrounding base stations does not perform the CCO adjustment, a message could be sent to the base station with a larger number of surrounding base stations to check whether the base station with a larger number of surrounding base stations would perform the CCO adjustment.

In some embodiments, when a base station with a larger number of surrounding base stations changes status from deactivation to activation and meanwhile there is another base station with a smaller number of surrounding base stations performing the CCO adjustment, the base station with a larger number of surrounding base stations would use a default TxPower and beam pattern until next CCO adjustment.

Figure 14:
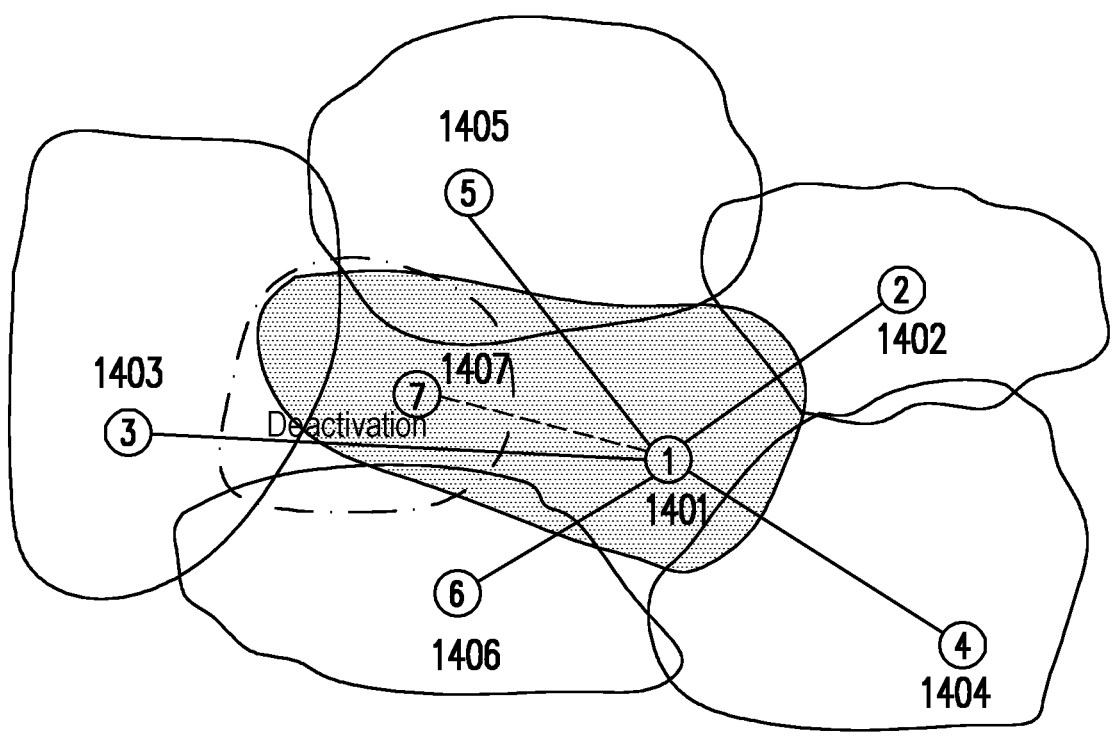
FIG. 14 is a first implementation example of a DSON performing a CCO adjustment according to one of the exemplary embodiments of the disclosure.

FIG. 14 is a first implementation example of a DSON performing a CCO adjustment according to one of the exemplary embodiments of the disclosure. Referring to FIG. 14, there are seven base stations 1401~1407 in the DSON system. Base stations 1401~1407 have corresponding coverage areas. When base station 1407 is deactivated, there may be a coverage hole. Base station 1401 may adjust coverage area to fit the coverage hole.

Figure 15:
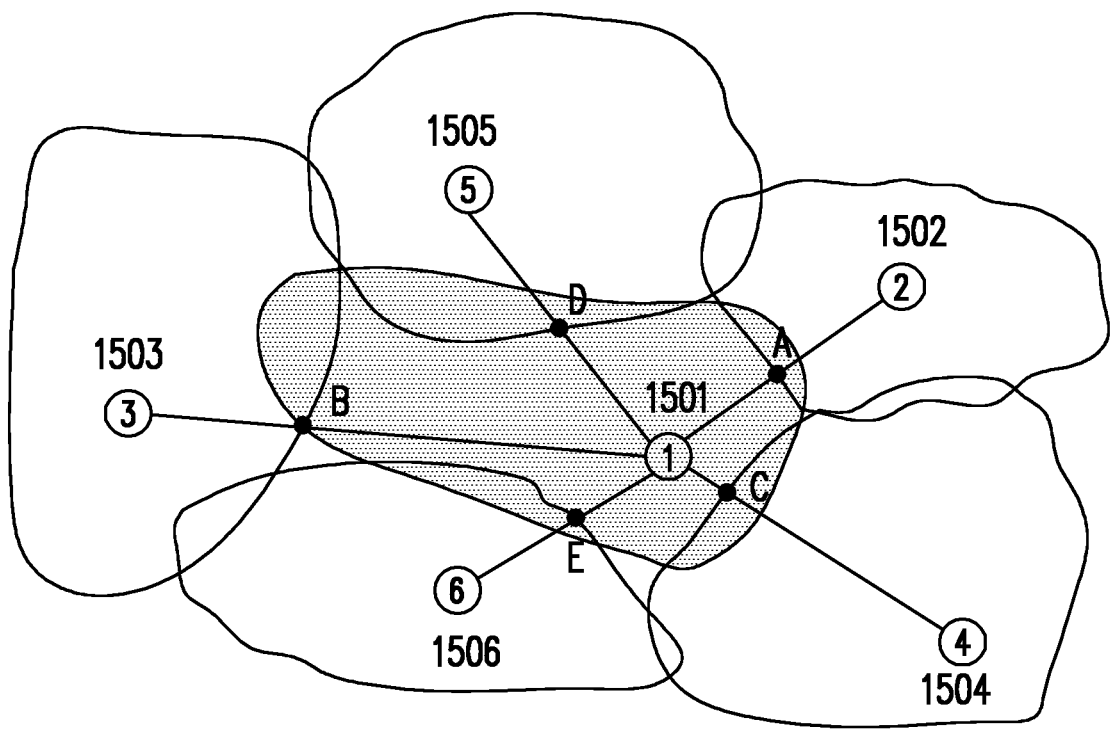
FIG. 15 is a second implementation example of a DSON performing a CCO adjustment according to one of the exemplary embodiments of the disclosure.

FIG. 15 is a second implementation example of a DSON performing a CCO adjustment according to one of the exemplary embodiments of the disclosure. Referring to FIG. 15, there are six base stations 1501~1506 in the DSON system. Base stations 1501~1506 have corresponding coverage areas. To perform CCO adjustment, base station 1501 may compute the coverage area of surrounding base stations 1502~1506 according to location, TxPower, and/or beam pattern of surrounding base stations 1502~1506. For example, the coverage area of a surrounding base station may be an area where the signal strength is stronger than a threshold. Then, base station 1501 may compute the intersection points A, B, C, D, E of the coverage areas and straight lines between base station 1501 and base stations 1502~1506. Next, base station 1501 may select a beam pattern and a minimum TxPower which lead to cover an area with the most intersections points. In one embodiment, base station 1501 may use brute force search to find the optimal beam pattern and TxPower.

Figure 16:
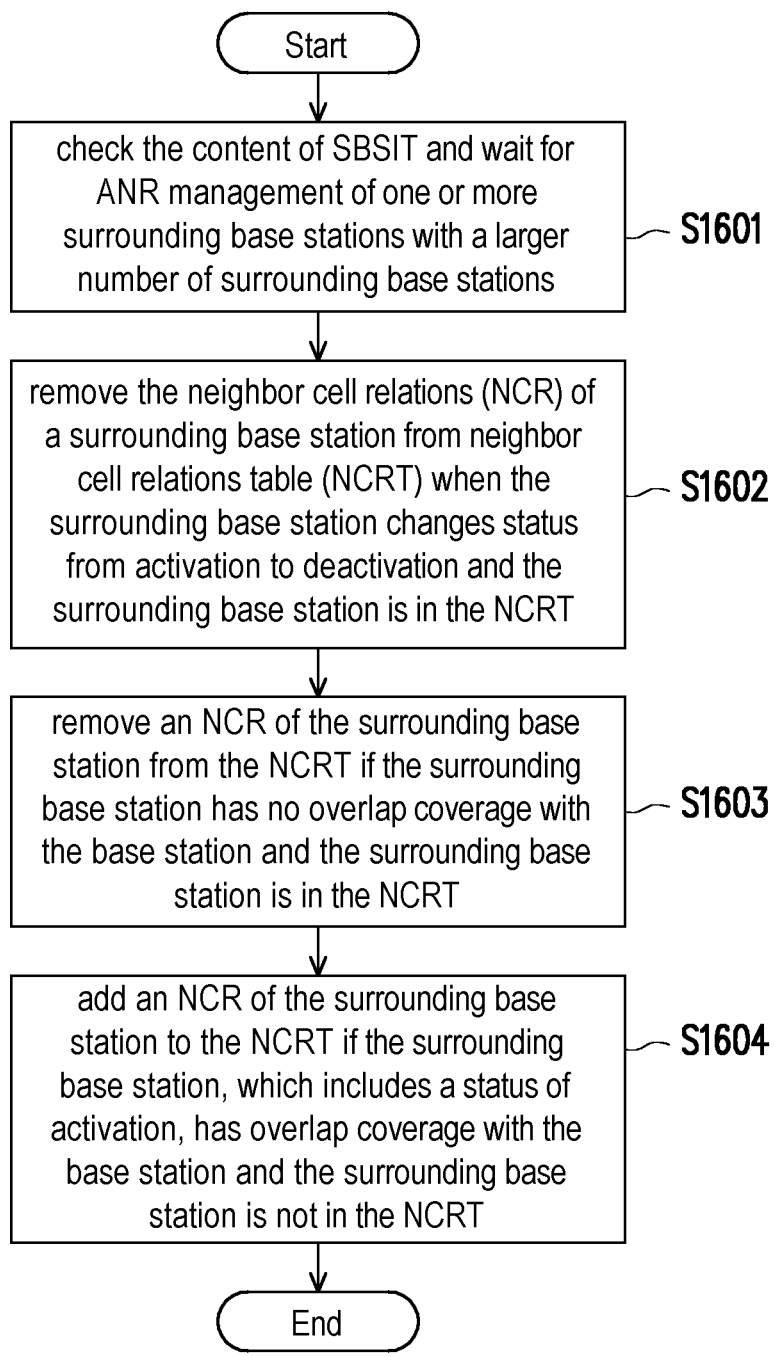
FIG. 16 is flow chart which illustrates the steps of executing an ANR algorithm according to one of the exemplary embodiments of the disclosure.

Referring to FIG. 16, steps S1601~S1604 elucidate the execution of an ANR algorithm according to one of the exemplary embodiments of the disclosure. In step S1601, a base station may check the content of SBSIT and wait for ANR management of one or more surrounding base stations with a larger number of surrounding base stations. After the ANR management of the one or more surrounding base stations with larger number of surrounding base stations are complete, the base station may perform ANR management. In step S1602, the base station may remove the neighbor cell relations (NCR) of a surrounding base station from neighbor cell relations table (NCRT) when the surrounding base station changes status from activation to deactivation and the surrounding base station is in the NCRT. In one embodiment, the NCRT is a table storing the relation between the neighboring BSs. In step S1603, the base station may remove an NCR of the surrounding base station from the NCRT if the surrounding base station has no overlap coverage with the base station and the surrounding base station is in the NCRT. For example, when the TxPower and/or beam pattern of the base station or the TxPower and/or beam pattern of the surrounding base station is changed, the base station would calculate the coverage area of the base station or the coverage area of the surrounding base station. If there is no overlap between the coverage area of the base station and the coverage area of the surrounding base station, the base station remove the NCR of the surrounding base station from the NCRT. In step S1604, the base station may add an NCR of the surrounding base station to the NCRT if the surrounding base station, which includes a status of activation, has overlap coverage with the base station and the surrounding base station is not in the NCRT. For example, when the TxPower and/or beam pattern of the base station or the TxPower and/or beam pattern of the surrounding base station is changed, the base station would calculate the coverage area of the base station or the coverage area of the surrounding base station. If there is overlap between the coverage area of the base station and the coverage area of the surrounding base station, the base station add the NCR of the surrounding base station into the NCRT.

Figure 17:
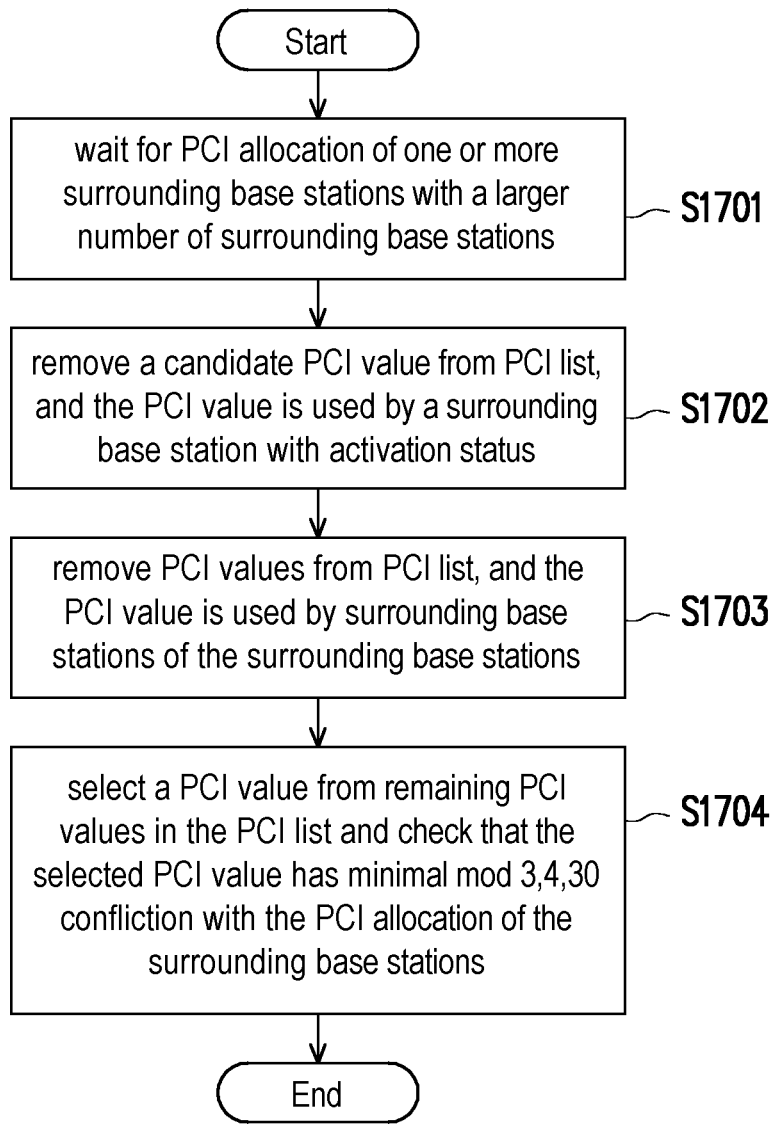
FIG. 17 is flow chart which illustrates the steps of executing a PCI algorithm according to one of the exemplary embodiments of the disclosure.

Referring to FIG. 17, steps S1701~S1704 elucidate the execution of a PCI allocation/reallocation algorithm according to one of the exemplary embodiments of the disclosure. In step S1701, a base station may wait for PCI allocation of one or more surrounding base stations with a larger number of surrounding base stations. After the PCI allocation of the one or more surrounding base stations with larger number of surrounding base stations are complete, the base station may perform the PCI allocation. In step S1702, the base station may remove a candidate PCI value from PCI list. The PCI value is used by a surrounding base station with activation status. In step S1703, the base station may remove PCI values from PCI list, and the PCI value is used by surrounding base stations of the surrounding base station. In step S1704, the base station may select a PCI value from remaining PCI values in the PCI list and check that the selected PCI value has minimal mod 3, 4, 30 confliction with the PCI allocation of the surrounding base stations.

Figure 18:
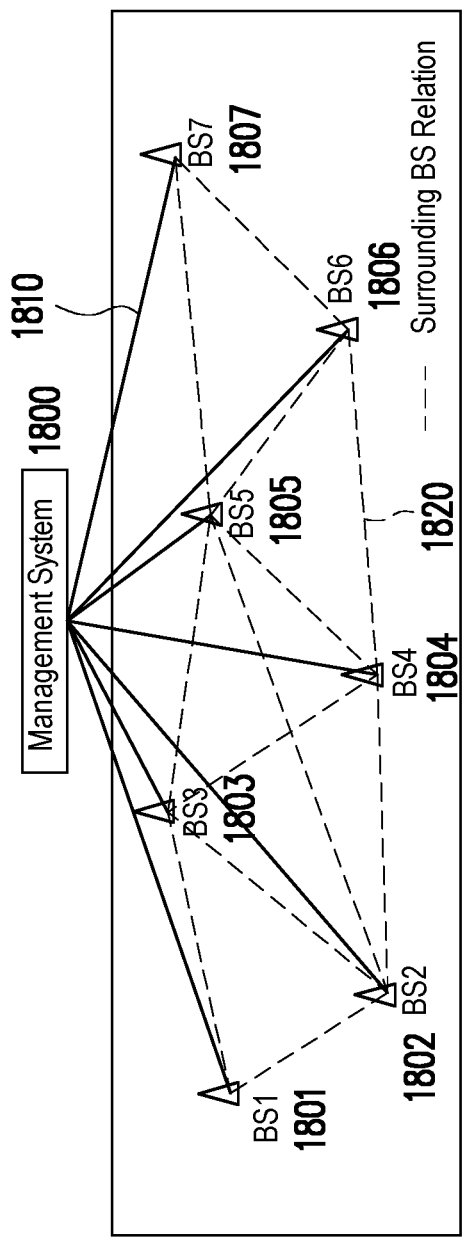
FIG. 18 is an application example of managing a DSON in a 5G private network.

FIG. 18 is an application example of managing a DSON in a 5G private network. Referring to FIG. 18, there are a management system 1800 and base stations 1801~1807 in the 5G private network. Base stations 1801~1807 may create a management interface and exchange information with the management system 1800. For example, link 1810 illustrates that base station 1807 may exchange information with management system 1800 through a management interface. The base stations 1801~1807 may also create a management interface to exchange information with each other. For example, link 1820 illustrates that base station 1804 may communicate with base station 1806 through a management interface.

Figure 19:
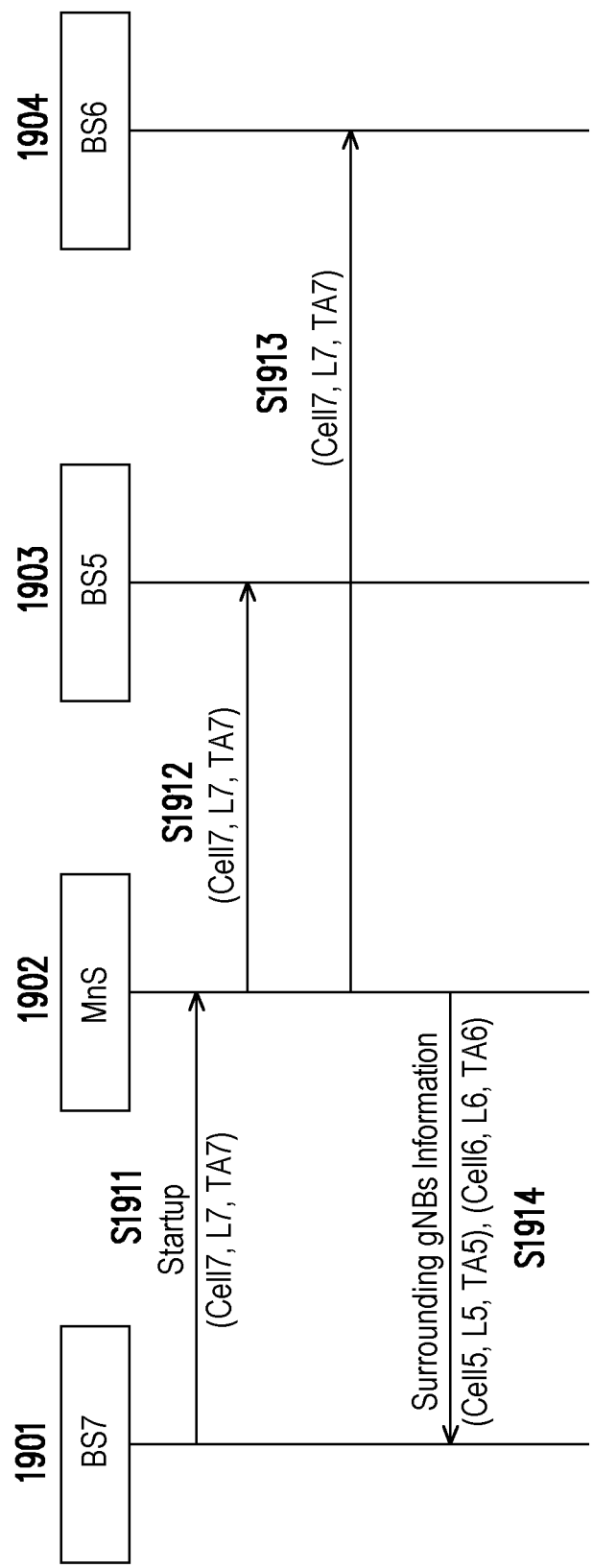
FIG. 19 is a signaling diagram which illustrates a base station receiving configuration information from surrounding base stations in an application example of a 5G private network.

FIG. 19 is a signaling diagram which illustrates a base station receiving configuration information from surrounding base stations in an application example of a 5G private network. FIG. 20 illustrates a first implementation example of a surrounding base station information table in the application example. Referring to FIG. 20, in this example, the SBSIT may store Cell ID 2001, TNL address 2002, and location 2003 to create management interfaces between base stations. As shown in FIG. 19, in the application example, base station 1901 (BS7) may get configuration information of base stations 1903 (BS5) and 1904 (BS6) through management system 1902. In step S1911, when base station 1901 is at startup stage, base station 1901 may transmit its configuration information to management system 1902. For example, the configuration information could be (Cell7, L7, TA7) where Cell7 is the Cell ID of base station 1901 (BS7), L7 is the location of base station 1901 (BS7), and TA7 is the TNL address of base station 1901 (BS7). In step S1912, management system 1902 may forward the configuration information (Cell7, L7, TA7) of base station 1901 to base station 1903. In step S1913, management system 1902 may forward the configuration information (Cell7, L7, TA7) of base station 1901 to base station 1904. Similarly, base stations 1903 (BS5) and 1904 (BS6) may also transmit their configuration information (Cell5, L5, TA5) and (Cell6, L6, TA6) to management system 1902. Cell5 is the Cell ID of base station 1903 (BS5), L5 is the location of base station 1903 (BS5), and TA5 is the TNL address of base station 1903 (BS5). Similarly, Cell6 is the Cell ID of base station 1904 (BS6), L6 is the location of base station 1904 (BS6), and TA6 is the TNL address of base station 1904 (BS6). In step S1914, management system may forward the configuration information (Cell5, L5, TA5) and (Cell6, L6, TA6) of base stations 1903 and 1904 to base station 1901.

Figure 21:
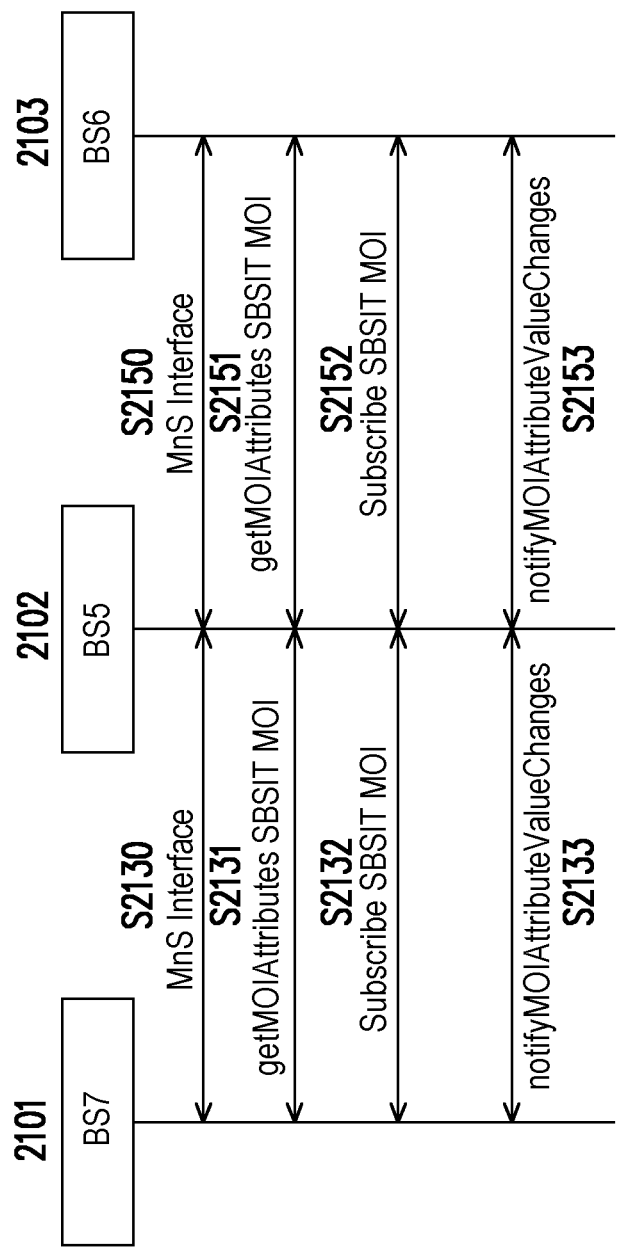
FIG. 21 is a signaling diagram which illustrates a base station subscribes to value changes in a surrounding base station information table through a notification in an application example of a 5G private network.

FIG. 21 is a signaling diagram which illustrates a base station subscribes to value changes in a surrounding base station information table through a notification in an application example of a 5G private network. Referring to FIG. 21, in step S2130, base station 2101 (BS7) may create a management interface to communicate with base station 2102 (BS5). In step S2131, through the management interface created between base station 2101 (BS7) and base station 2102 (BS5), base station 2101 (BS7) may get MOI attributes of SBSIT from base station 2102 (BS5). In step S2132, base station 2101 (BS7) may subscribe to value changes in SBSIT of base station 2102 (BS5). In step S2133, base station 2101 (BS7) may get notification of the subscribed value changes in SBSIT of base station 2102 (BS5). Similarly, in step S2150, base station 2102 (BS5) may also create a management interface to communicate with base station 2103 (BS6). In step 2151, through the management interface created between base station 2102 (BS5) and base station 2103 (BS6), base station 2102 (BS5) may get MOI attributes of SBSIT from base station 2103 (BS6). In step S2152, base station 2102 (BS5) may subscribe to value changes in SBSIT of base station 2103 (BS6). In step S2153, base station 2102 (BS5) may get notification of the subscribed value changes in SBSIT of base station 2103 (BS6). Through the management interface created between base station 2101 (BS7) and base station 2102 (BS5), base station 2102 (BS5) may also subscribe to value changes in SBSIT of base station 2101 (BS7), and base station 2102 (BS5) may also get notification of the subscribed value changes in SBSIT of base station 2101 (BS7). Similarly, through the management interface created between base station 2102 (BS5) and base station 2103 (BS6), base station 2103 (BS6) may also subscribe to value changes in SBSIT of base station 2102 (BS5), and base station 2103 (BS6) may also get notification of the subscribed value changes in SBSIT of base station 2102 (BS5).

FIG. 22 illustrates a second implementation example of a surrounding base station information table in an application example of a 5G private network. In one embodiment, status 2201 of a surrounding base station may be used to determine whether to keep the surrounding base station in the SBSIT.

Figure 23:
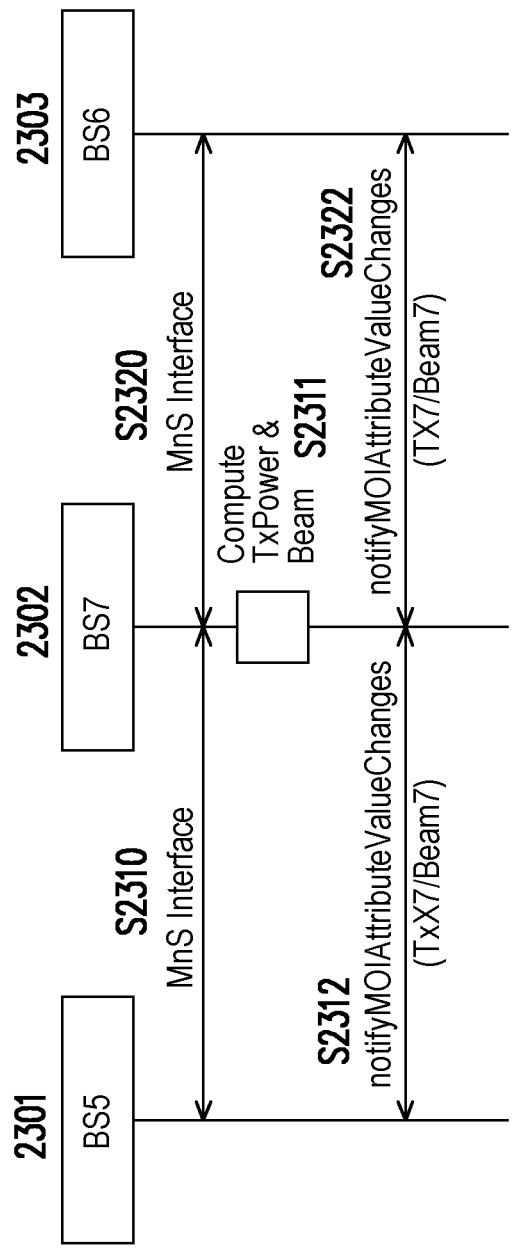
FIG. 23 is a signaling diagram which illustrates a base station performing a CCO adjustment based on notification of value changes in a surrounding base station information table in an application example of a 5G private network.

FIG. 23 is a signaling diagram which illustrates a base station performing a CCO adjustment based on notification of value changes in a surrounding base station information table in an application example of a 5G private network. In step S2310, base station 2301 (BS5) may create MnS interface to communicate with base station 2302 (BS7). Similarly, in step S2320, base station 2302 (BS7) may also create MnS interface to communicate with base station 2303 (BS6). In step S2311, base station 2302 (BS7) may determine TxPower and beam pattern according to configuration information (location, TxPower, and beam pattern) received from base station 2301 (BS5) and base station 2303 (BS6). In step S2312, base station 2301 (BS5) may get notification of value changes in SBSIT after base station 2302 (BS7) has determined TxPower and beam pattern. Similarly, in step S2322, base station 2303 (BS6) may get notification of value changes in SBSIT after base station 2302 (BS7) has determined TxPower and beam pattern.

In some embodiments, base station 2302 (BS7) may perform ANR establishment after the CCO adjustment. Base station 2302 (BS7) may determine whether base station 2301 (BS5) and base station 2302 (BS7) are neighboring base stations. Base station 2302 (BS7) may determine whether there is a coverage area overlap according to TxPower and beam pattern in SBSIT. Base station 2302 (BS7) may update neighbor cell relations table to add base station 2301 (BS5) and base station 2303 (BS6). Base station 2302 (BS7) may update the number of surrounding base stations to be two in the SBSIT. Base station 2302 (BS7) may update the neighboring base station's PCI list to be PCI values of base station 2301 (BS5) and base station 2303 (BS6).

In some embodiments, base station 2302 (BS7) may perform PCI allocation/reallocation after the CCO adjustment and the ANR establishment. Base station 2302 (BS7) may determine a set of PCI values. Base station 2302 (BS7) may remove the PCI values of base station 2301 (BS5) and base station 2303 (BS6) from the set of PCI values. Base station 2302 (BS7) may remove the PCI values in the neighboring base station's PCI lists of base station 2301 (BS5) and base station 2303 (BS6) from the set of PCI values. Base station 2302 (BS7) may select a PCI value from the set of PCI values such that the PCI value has minimal mod 3, 4, 30 confliction with the PCI values of base station 2301 (BS5) and base station 2303 (BS6).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A base station comprising:
    a transmitter;
    a receiver; and
    a processor coupled to the transmitter and the receiver and configured to:
        create a management interface for receiving configuration information from surrounding base stations;
        subscribe the configuration information and store the configuration information into a table;
        receive, via the receiver through the management interface, the configuration information from at least one of the surrounding base stations;
        update the table based on the configuration information received from the at least one of the surrounding base stations; and
        execute a distributed self-organizing network (DSON) algorithm comprising one of capacity and coverage optimization (CCO) algorithm, automatic neighbor relation (ANR) algorithm, and physical cell id (PCI) algorithm,
        wherein the processor is configured to execute the CCO algorithm comprising:
            waiting for a CCO adjustment of a surrounding base station with a larger number of surrounding base stations according to the table;
            estimating a coverage area of the surrounding base stations of the base station; and
            selecting a beam pattern and a transmission power according to the coverage area.

2. The base station of claim 1, wherein the processor is configured to execute the CCO algorithm, the ANR algorithm, and the PCI algorithm sequentially.

3. The base station of claim 1, wherein the processor is configured to execute the ANR algorithm comprising:
    waiting for an ANR management of a first surrounding base station with a larger number of surrounding base stations according to the table;
    removing a second surrounding base station from a neighbor cell relation table (NCRT) in response to the second surrounding base station's status being deactivation;
    removing a third surrounding base station from the NCRT in response to the third surrounding base station has no overlap coverage with the base station; and
    adding a fourth surrounding base station to the NCRT in response to the fourth surrounding base station's status being activation and the fourth surrounding base station has an overlap coverage with the base station.

4. The base station of claim 1, wherein the processor is configured to execute the PCI algorithm comprising:
    waiting for a PCI allocation of a first surrounding base station with a larger number of surrounding base stations according to the table;
    removing a candidate PCI value used by a second surrounding base station from a PCI list;
    removing PCI values used by third surrounding base stations of the second surrounding base station from the PCI list; and
    selecting a PCI value from remaining PCI values in the PCI list and check that the selected PCI value has minimal confliction with PCI allocation of the surrounding base stations of the base station.

5. The base station of claim 1, wherein the base station creates a management interface for receiving configuration information from surrounding base stations, further configured to:
    send the configuration information to a management system, wherein the management system forwards the configuration information to the surrounding base stations; and
    receive from the management system the configuration information of the surrounding base stations.

6. The base station of claim 1, wherein the table comprising at least one of cell id, transport layer (TNL) address, physical cell id (PCI), neighboring base station's PCI list, number of surrounding base stations, location, transmission power, and status.

7. The base station of claim 1, wherein the processor is further configured to:

broadcast the configuration information to the surrounding base stations.

8. The base station of claim 1, wherein the processor is further configured to:
compute a distance between the base station and the at least one of the surrounding base stations;
determine a threshold according to the distance; and
respond the configuration information to the at least one of the surrounding base stations in response to the distance is smaller than the threshold.

9. The base station of claim 1, wherein the processor is further configured to:
subscribe to a value change in a second table of the at least one of the surrounding base stations;
unsubscribe to the value change in the second table of the at least one of the surrounding base stations; and
receive a notification of the value change in the second table of the at least one of the surrounding base stations.

10. A method of managing a distributed self-organizing network by surrounding base station information, applicable to a base station, the method comprising:
creating a management interface for receiving configuration information from surrounding base stations;
subscribing the configuration information and storing the configuration information into a table;
receiving, via the receiver through the management interface, the configuration information from at least one of the surrounding base stations;
updating the table based on the configuration information received from the at least one of the surrounding base stations; and
executing a distributed self-organizing network (DSON) algorithm comprising a capacity and coverage optimization (CCO) algorithm, an automatic neighbor relation (ANR) algorithm, and a physical cell id (PCI) algorithm,
wherein the CCO algorithm comprising:
waiting for a CCO adjustment of a surrounding base station with a larger number of surrounding base stations according to the table;
estimating a coverage area of the surrounding base stations of the base station; and
selecting a beam pattern and a transmission power according to the coverage area.

11. The method of claim 10, wherein the CCO algorithm, the ANR algorithm, and the PCI algorithm are executed sequentially.

12. The method of claim 10, wherein the ANR algorithm comprising:
waiting for an ANR management of a first surrounding base station with a larger number of surrounding base stations according to the table;
removing a second surrounding base station from a neighbor cell relation table (NCRT) in response to the second surrounding base station's status being deactivation;
removing a third surrounding base station from the NCRT in response to the third surrounding base station has no overlap coverage with the base station; and
adding a fourth surrounding base station to the NCRT in response to the fourth surrounding base station's status being activation and the fourth surrounding base station has an overlap coverage with the base station.

13. The method of claim 10, wherein the PCI algorithm comprising:
waiting for a PCI allocation of a first surrounding base station with a larger number of surrounding base stations according to the table;
removing a candidate PCI value used by a second surrounding station from a PCI list;
removing PCI values used by third surrounding base stations of the second surrounding base station from the PCI list; and
selecting a PCI value from remaining PCI values in the PCI list and check that the selected PCI value has minimal confliction with PCI allocation of the surrounding base stations of the base station.

14. The method of claim 10, wherein the step of creating a management interface for receiving configuration information from surrounding base stations further comprising:
sending the configuration information to a management system, wherein the management system forwards the configuration information to the surrounding base stations; and
receiving from the management system the configuration information of the surrounding base stations.

15. The method of claim 10, wherein the table comprising at least one of cell id, transport layer (TNL) address, physical cell id (PCI), neighboring base station's PCI list, number of surrounding base stations, location, transmission power, and status.

16. The method of claim 10, further comprising:
broadcasting the configuration information to the surrounding base stations.

17. The method of claim 10, further comprising:
computing a distance between the base station and the at least one of the surrounding base stations;
determining a threshold according to the distance; and
responding the configuration information to the at least one of the surrounding base stations in response to the distance is smaller than the threshold.

18. The method of claim 10, further comprising:
subscribing to a value change in a second table of the at least one of the surrounding base stations;
unsubscribing to the value change in the second table of the at least one of the surrounding base stations; and
receiving a notification of the value change in the second table of the at least one of the surrounding base stations.

* * * * *